United States Patent
Shimada

(10) Patent No.: US 8,051,708 B2
(45) Date of Patent: Nov. 8, 2011

(54) TEMPERATURE MEASURING CIRCUIT IN A FLOWMETER

(75) Inventor: Hideki Shimada, Tokyo (JP)

(73) Assignee: Oval Corporation, Tokyo (JP)

( * ) Notice: Subject to any disclaimer, the term of this patent is extended or adjusted under 35 U.S.C. 154(b) by 353 days.

(21) Appl. No.: 12/520,249

(22) PCT Filed: Oct. 15, 2008

(86) PCT No.: PCT/JP2008/069078
§ 371 (c)(1),
(2), (4) Date: Jun. 19, 2009

(87) PCT Pub. No.: WO2010/013360
PCT Pub. Date: Feb. 4, 2010

(65) Prior Publication Data
US 2010/0326185 A1  Dec. 30, 2010

(30) Foreign Application Priority Data
Jul. 28, 2008  (JP) .................................. 2008-193343

(51) Int. Cl.
*G01F 1/69* (2006.01)
(52) U.S. Cl. .................................................... 73/204.27

(58) Field of Classification Search .................... None
See application file for complete search history.

(56) References Cited

U.S. PATENT DOCUMENTS

| | | | |
|---|---|---|---|
| 5,379,649 A | 1/1995 | Kalotay | |
| 5,929,344 A * | 7/1999 | Hays et al. | ............... 73/861.357 |
| 7,010,971 B2 * | 3/2006 | Matsumoto et al. | ....... 73/204.15 |

FOREIGN PATENT DOCUMENTS

| | | |
|---|---|---|
| JP | 01-291133 | 11/1989 |
| JP | 07-286910 | 10/1995 |
| JP | 3105253 | 10/2000 |

* cited by examiner

*Primary Examiner* — Andre Allen
(74) *Attorney, Agent, or Firm* — Wenderoth, Lind & Ponack, L.L.P.

(57) ABSTRACT

A value of a line-to-line resistor (24) is determined by subtracting a resistance value determined as a product of a voltage ratio based on divided voltages and a value of a reference resistor in a non-conductive state between a second electric wire (26) and a third electric wire (27) from a resistance value determined as a product of a voltage ratio based on the divided voltages and the value of the reference resistor in a conductive state therebetween. Once the value of the line-to-line resistor (24) is determined, it becomes possible to determine a compensated resistance value related to temperature.

2 Claims, 6 Drawing Sheets

TEMPERATURE MEASURING CIRCUIT IN A FLOWMETER

TECHNICAL FIELD

The present invention relates to a temperature measuring circuit in a flowmeter.

BACKGROUND ART

A Coriolis flowmeter is a mass flowmeter that supports both ends of a measuring tube through which a fluid to be measured flows, and detects a phase difference signal proportional to a mass flow rate at symmetric positions between both-end supported portions and a center portion of the thus supported measuring tube at a time when the center portion of the supported measuring tube is alternately driven in a direction perpendicular to a line of support. The measuring tube is formed of a metal material having a Young's modulus that changes with a temperature. Hence, in order to maintain high measurement accuracy, it is necessary to measure the temperature of the measuring tube, and to compensate for the change of the Young's modulus, which follows a change of the temperature.

A description is made below of the temperature measurement using the Coriolis flowmeter by way of a conventional example thereof (for example, see Japanese Patent No. 3105253). As illustrated in FIG. 6, in the conventional temperature measurement, a bridge voltage is input to a subtraction circuit by using a resistor bridge, and a voltage output therefrom is input to a V/F converter, is converted into a frequency, and is arithmetically converted into resistance in a CPU, whereby the temperature is determined. Reference numeral 1 of FIG. 6 denotes a platinum temperature measuring resistor (PT100: 100Ω) as a resistor-type temperature sensor. Further, reference numeral 2 denotes a resistor bridge unit; 3, electric wires having line-to-line resistors (RC); 4, a voltage reference (VCC); 5, a reference resistor (Rref: 100Ω); 6, the V/F converter; and 7, the CPU.

In the V/F converter 6, for example, such an output of the frequency therefrom is represented by the following expression.

[Expression 1]

$$F_{out} = \frac{V3 \cdot R12}{2.09 \cdot R8 \cdot R10 \cdot C1}$$

As understood from the above-mentioned expression, in the V/F converter 6, the frequency output is decided by ratios among resistors and a capacitor, and accordingly, temperature characteristics of the resistors and the capacitor are extremely important. In particular, the capacitor is inferior to the resistors in temperature characteristics, and accordingly, the frequency output is affected by ambient temperature of a circuit every time when the ambient temperature thereof is changed. Therefore, the V/F converter 6 has a problem of being sometimes incapable of performing accurate temperature measurement.

When the temperature is attempted to be determined in the above-mentioned configuration while defining the bridge voltage of the platinum temperature measuring resistor 1 as V1, the bridge voltage of the reference resistor 5 as V2, and the output voltage from the resistor bridge unit 2 as V3, V1 to V3 are represented by the following expressions.

[Expression 2]

$$V1 = \frac{PT100 + RC}{PT100 + RC + R1} VCC$$

[Expression 3]

$$V2 = \frac{100 + RC}{100 + RC + R4} VCC$$

[Expression 4]

$$V3 = \frac{R5}{R2} V1 - \frac{R4}{R3} V2$$

As understood from the above-mentioned expressions, the output voltage V3 from the resistor bridge unit 2 is decided by ratios among at least six resistors. A problem here is that temperature characteristics of the six resistors simultaneously affect the output voltage V3 though it is understood that the temperature characteristics of each of the resistors are extremely good. This is an extremely serious problem in performing the accurate temperature measurement.

DISCLOSURE OF THE INVENTION

Some problems of the circuit related to the conventional temperature measurement are described below.

A first problem is that temperature characteristics of the circuit are not good. This is because, when temperature characteristics of components other than the reference resistor 5 are changed by an influence from the ambient temperature and the like, a large measurement error is caused thereby. Further, this is because, in the case where the change of the temperature characteristics of the V/F converter 6 used at a latter stage becomes large particularly with respect to the ambient temperature, a measured temperature is largely changed by an influence of self-heat generation in the converter of the Coriolis flowmeter after the converter is energized.

A second problem is that an individual difference among the circuits becomes large because the number of components is large. This is because the change of the temperature characteristics of each of the components directly affects performance of the circuit (the individual difference is large and the performances of the circuits are also various, and accordingly, variations due to the individual difference cannot be overlooked). Besides, the circuit combines a secondary drawback that attention must be paid to calibration for adjusting the individual difference, and the like.

A third problem is that components must be further added to the circuit in the case of performing the measurement while providing a plurality of temperature measuring positions of a sensor (while providing two or more circuits). Therefore, it becomes impossible to ignore complicated influences on the performance and the temperature change.

The present invention has been made in view of the above-mentioned circumstances, and it is an object of the present invention to provide a temperature measuring circuit in the flowmeter, which is capable of reducing the number of components, and of reducing the effect of characteristic changes of the components, which are caused by the individual difference among the components and by the temperature of the components.

A temperature measuring circuit in a flowmeter according to claim 1 of the present invention, which has been made to solve the above-mentioned object, includes: first and second resistor-type temperature sensors which are provided at first and second measuring positions in the flowmeter and form a serial connection state when one ends of the sensors are connected to each other; a first electric wire which includes a line-to-line resistor and is connected to another end of the first resistor-type temperature sensor; a voltage reference connected to the first electric wire through a power supply resistor; a second electric wire which includes a line-to-line resistor and is connected to the one ends of the first and second resistor-type temperature sensors; a third electric wire which includes a line-to-line resistor and is connected to another end of the second resistor-type temperature sensor; a reference resistor in which one end thereof is connected to the third electric wire and another end side thereof is grounded; a switching device that is connected to both of the second electric wire and the third electric wire and turns those electric wires to a conductive state or a non-conductive state; a multiplexer that selects any one of the first electric wire, the second electric wire, the third electric wire, and the grounded side of the reference resistor; an A/D converter that performs A/D conversion on divided voltages selected by the multiplexer; and an arithmetic operation/control device that controls the switching device and receives a signal from the A/D converter, in which the arithmetic operation/control device determines a value of the line-to-line resistor by subtracting a resistance value determined as a product of a voltage ratio based on the divided voltages and a value of the reference resistor in the non-conductive state between the second electric wire and the third electric wire from a resistance value determined as a product of a voltage ratio based on the divided voltages and a value of the reference resistor in the conductive state therebetween.

According to the present invention having such a feature as described above, the components other than the reference resistor are not affected by the temperature or the individual difference. Further, according to the present invention, even if measured voltages are changed in measurement of the divided voltages, the changes of the measured voltages do not affect measurement of the resistance if the voltage ratio is correct. Still further, according to the present invention, constituent elements (components) of the circuit are reduced.

According to a temperature measuring circuit in a flowmeter according to claim 2 of the present invention, in the temperature measuring circuit in a flowmeter according to claim 1 of the present invention, the determined value of the line-to-line resistor is corrected by a hyperbolic approximate expression related to the second resistor-type temperature sensor, to determine a corrected value of the line-to-line resistor.

According to the present invention having such a feature as described above, it becomes possible to suppress the measurement error in a wide measurement temperature range to be extremely low. By applying a hyperbolic approximate expression (Y=1/X), it becomes possible to suppress addition to the number of components.

According to the present invention, there are exerted an effect that the temperature measuring circuit is capable of reducing the number of components, and of reducing the effect of the characteristic changes of the components, which are caused by the individual difference among the components and by the temperature of the components.

BEST MODE FOR CARRYING OUT THE INVENTION

Figure 1:
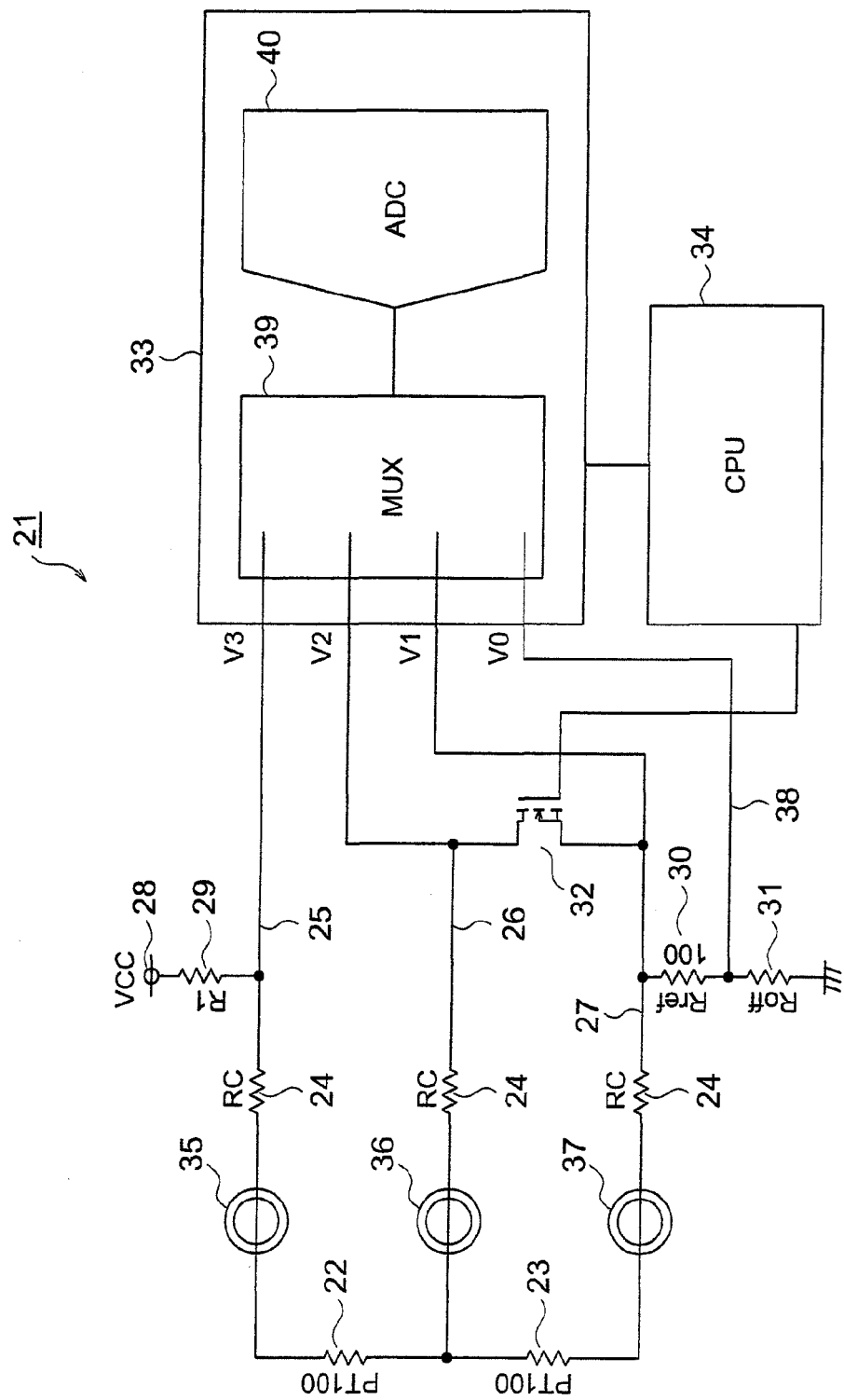
FIG. 1 is a basic configuration diagram illustrating an embodiment of a temperature measuring circuit in a flowmeter of the present invention.

While referring to the drawings, a description is made below. FIG. 1 is a basic configuration diagram illustrating an embodiment of a temperature measuring circuit in a flowmeter of the present invention.

In FIG. 1, reference numeral 21 denotes the temperature measuring circuit. The temperature measuring circuit 21 is provided as a constituent of a Coriolis flowmeter (not shown). The temperature measuring circuit 21 is constructed by including: a first resistor-type temperature sensor 22 (PT100: 100Ω); a second resistor-type temperature sensor 23 (PT100: 100Ω); a first electric wire 25 having a line-to-line resistor 24 (RC); a second electric wire 26 having a line-to-line resistor 24 (RC) in the same way; a third electric wire 27 having a line-to-line resistor 24 (RC) in the same way; a voltage reference 28 (VCC); a power supply resistor 29 (R1); a reference resistor 30 (Rref: 100Ω); an offset resistor 31 (Roff); an FET 32 (switching device); a multiplexer-added A/D converter 33; and a CPU 34 (arithmetic operation/control device).

The first resistor-type temperature sensor 22 and the second resistor-type temperature sensor 23 are temperature sensors provided at predetermined measuring positions of a measuring tube in the Coriolis flowmeter (not shown), and those sensors form a serial connection state in such a manner that one end of one of the sensors is connected to one end of the other. For the first resistor-type temperature sensor 22 and the second resistor-type temperature sensor 23, publicly-known platinum temperature measuring resistors are used. The other end of the first resistor-type temperature sensor 22 as described above is connected to a terminal 35. Further, the one end of the first resistor-type temperature sensor 22 and the one end of the second resistor-type temperature sensor 23 are connected to a terminal 36. Still further, the other end of the second resistor-type temperature sensor 23 is connected to a terminal 37.

To the terminal 35 to which the other end of the first resistor-type temperature sensor 22 is connected, one end of the first electric wire 25 is connected. To the first electric wire 25, the voltage reference 28 is connected through the power supply resistor 29. The other end of the first electric wire 25 is connected to the multiplexer-added A/D converter 33.

To the terminal 36 to which the one end of the first resistor-type temperature sensor 22 and the one end of the second resistor-type temperature sensor 23 are connected, one end of the second electric wire 26 is connected. To the other end of the second electric wire 26, the multiplexer-added A/D converter 33 is connected.

To the terminal 37 to which the other end of the second resistor-type temperature sensor 23 is connected, one end of the third electric wire 27 is connected. To the third electric wire 27, one end of the reference resistor 30 is connected. The other end of the reference resistor 30 is grounded through the offset resistor 31, and is connected to the multiplexer-added A/D converter 33 through a line 38. The other end of the third electric wire 27 is connected to the multiplexer-added A/D converter 33.

In the FET 32, a relation between a drain and a source thereof is set so that a current flows from the second electric wire 26 to the third electric wire 27. A gate of the FET 32 is connected to the CPU 34. The FET 32 is controlled by the CPU 34, and is thereby made capable of setting a conduction state or a non-conduction state between the second electric wire 26 and the third electric wire 27.

The multiplexer-added A/D converter 33 is constructed by including: a multiplexer 39 to which the line 38 and the other ends of the first to third electric wires 25 to 27 are connected; and an A/D converter 40 that performs A/D conversion on an output from the multiplexer 39. The multiplexer-added A/D converter 33 can perform the A/D conversion on respective divided voltages, and output those divided voltages to the CPU 34.

The CPU 34 is an arithmetic operation/control device having an arithmetic operation function and a control function, and here, at least the multiplexer-added A/D converter 33 and the FET 32 are connected thereto. Even in the above-mentioned configuration in which the number of components except the multiplexer-added A/D converter 33 and the FET 32 is suppressed to the minimum, the CPU 34 can perform highly accurate temperature measurement. Note that the arithmetic operation and the like in the CPU 34 can be understood from expressions described in the following description, and are accordingly omitted here.

Next, while referring to FIGS. 2 to 5, it is described that the temperature measuring circuit 21 illustrated in FIG. 1 according to the present invention is useful.

Figure 2:
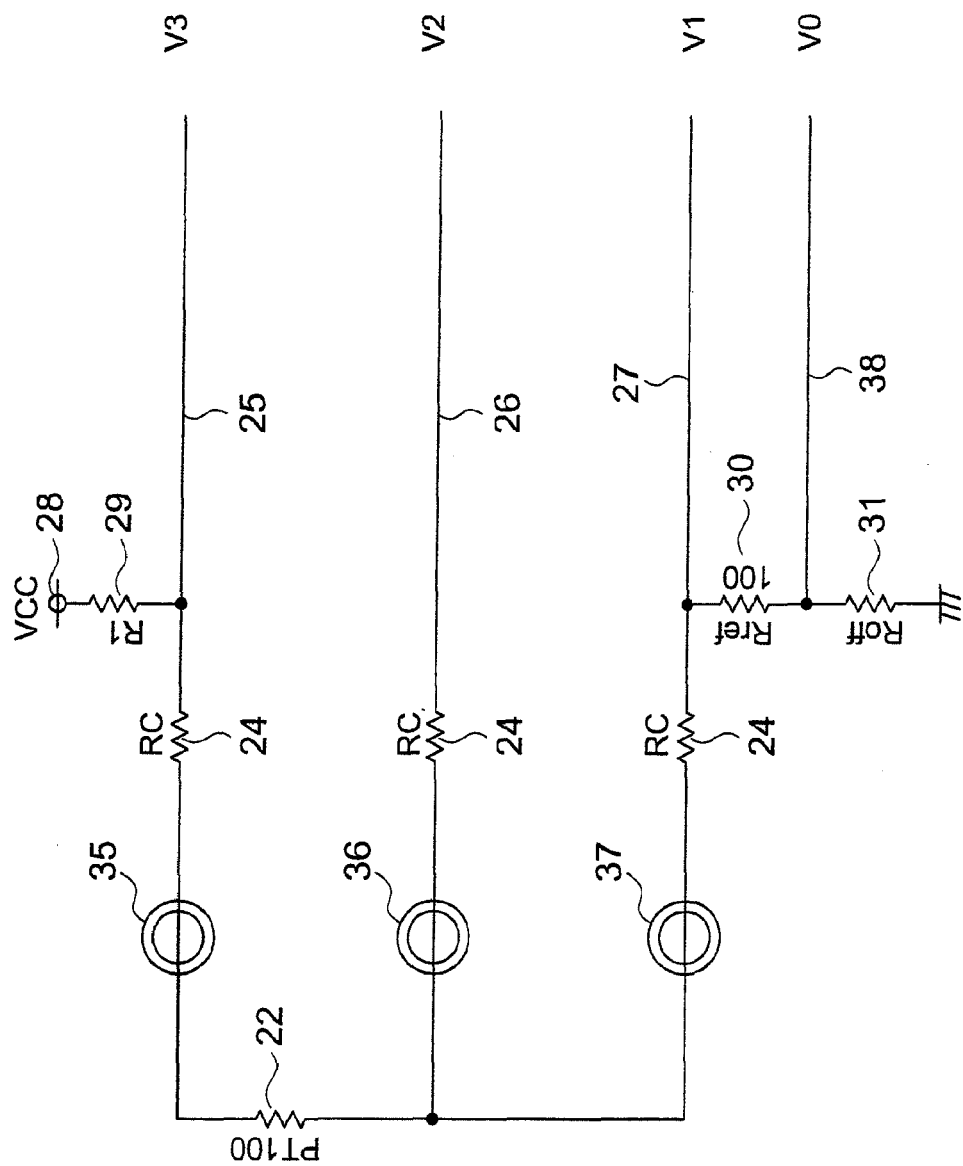
FIG. 2 is an explanatory diagram for illustrating that the present invention is useful, and illustrating a case where the number of resistor-type temperature sensors is one.
Figure 3:
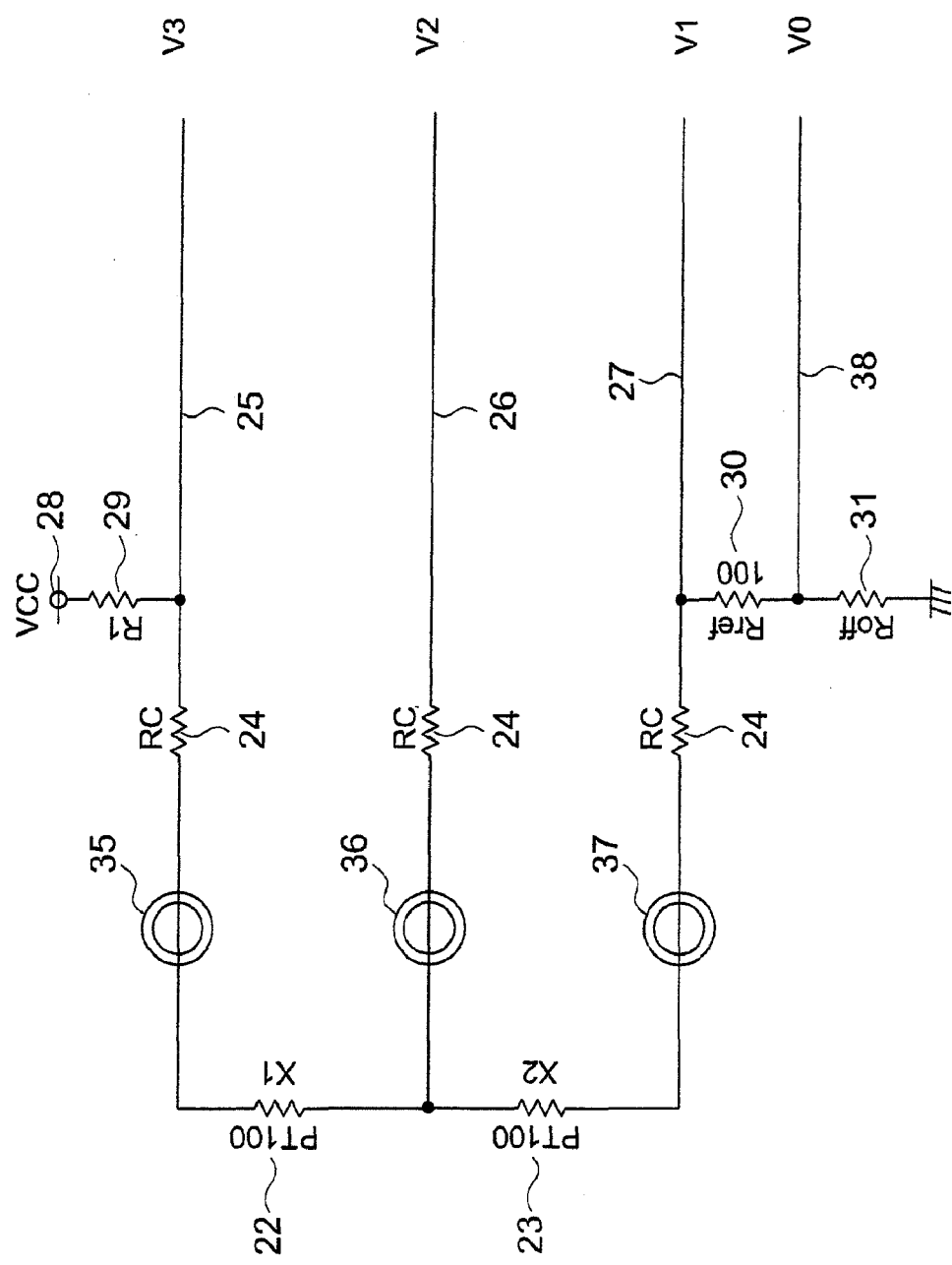
FIG. 3 is an explanatory diagram for illustrating that the present invention is useful, and illustrating a case where the number of resistor-type temperature sensors is two.
Figure 4:
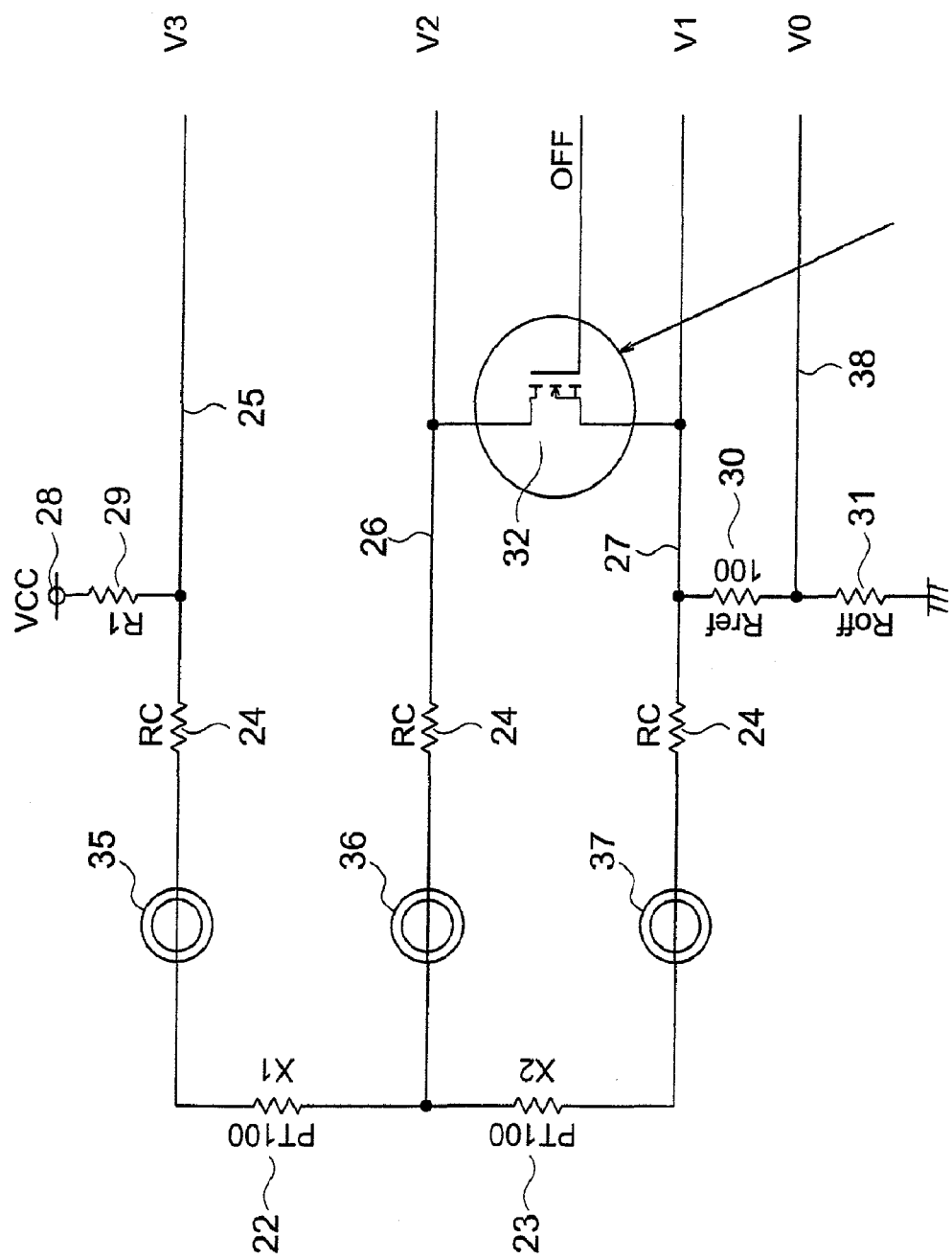
FIG. 4 is an explanatory diagram for illustrating that the present invention is useful, and illustrating a case where the temperature measuring circuit can be used even when line-to-line resistance is large.
Figure 5:
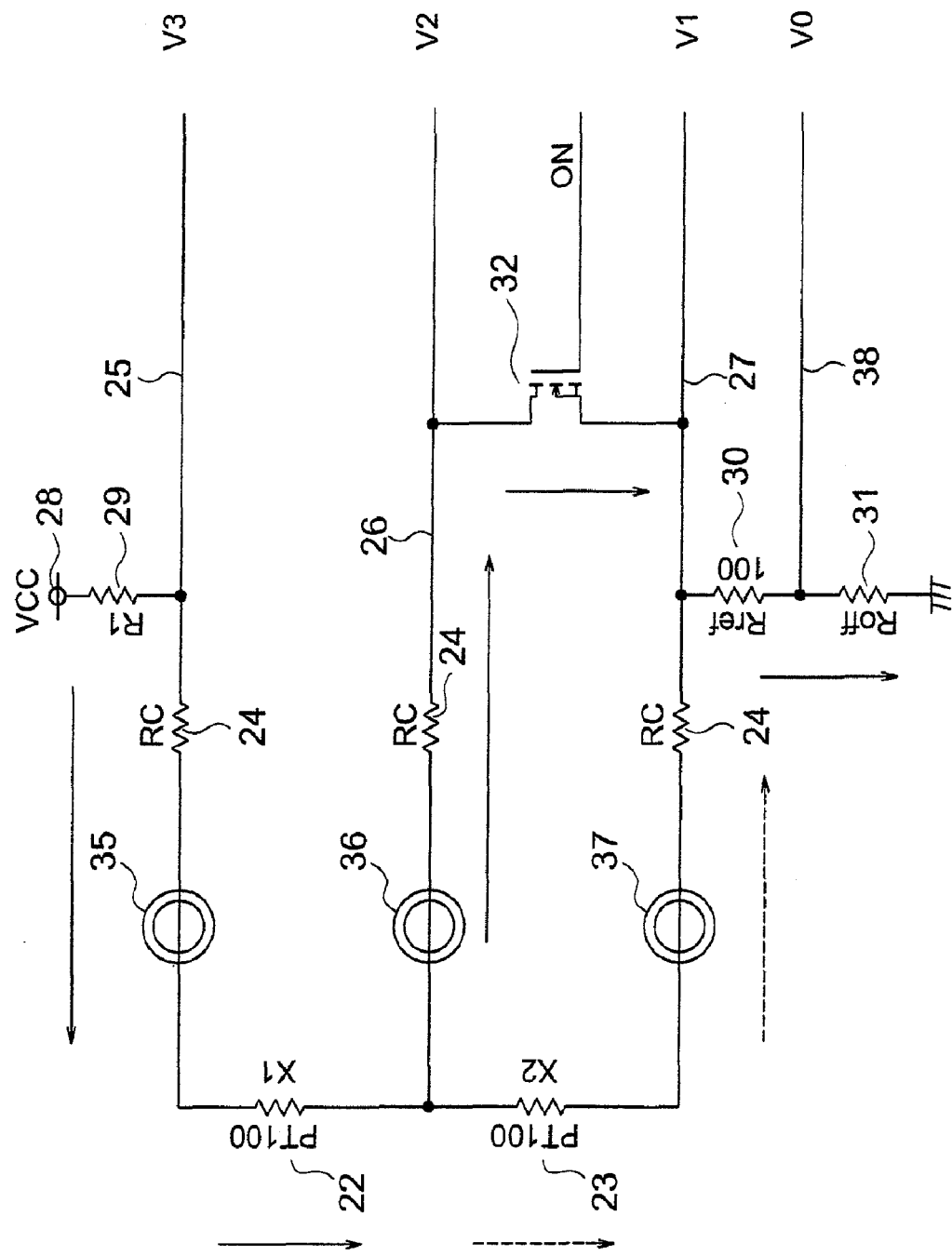
FIG. 5 is an explanatory diagram for illustrating that the present invention is useful, and illustrating a case where flows of currents are added to FIG. 4.
Figure 6:
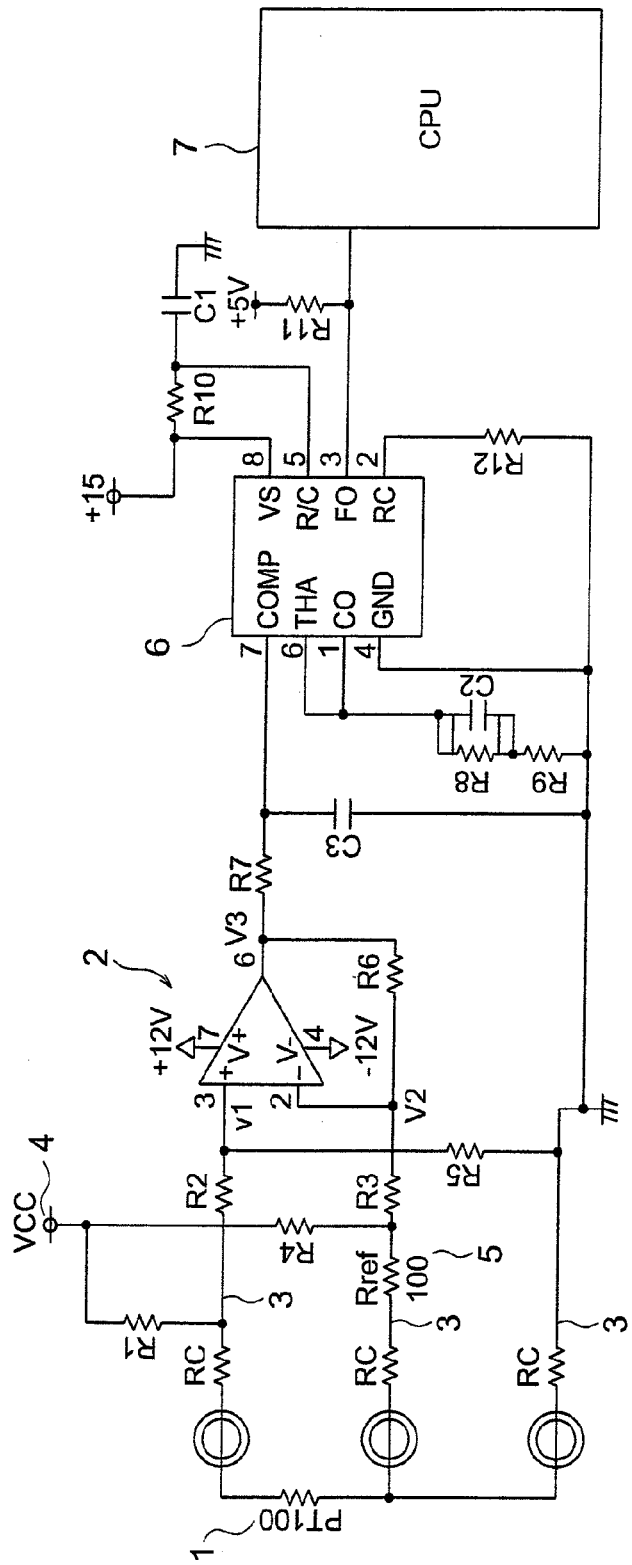
FIG. 6 is a circuit diagram according to conventional temperature measurement.

FIG. 2 is an explanatory diagram in a case where the number of resistor-type temperature sensors is one, FIG. 3 is an explanatory diagram in a case where the number of resistor-type temperature sensors is two, FIG. 4 is an explanatory diagram in a case where the temperature measuring circuit 21 can be used even when line-to-line resistance is large, and FIG. 5 is an explanatory diagram in a case where flows of currents are added to FIG. 4. Note that the same reference numerals denote basically the same ones as those in the configuration illustrated in FIG. 1, and a description thereof is omitted.

In FIG. 2, a basic concept of the circuit illustrated here is that divided voltage values of the resistors are directly measured by the multiplexer-added A/D converter 33 (see FIG. 1). When the divided voltage on a terminal of the line 38 is defined as V0, the divided voltage on a terminal of the third electric wire 27 is defined as V1, the divided voltage on a terminal of the second electric wire 26 is defined as V2, and the divided voltage on a terminal of the second electric wire 26 is defined as V3, the PT100 (for example, corresponding to the first resistor-type temperature sensor 22) is represented by the following expression (1).

[Expression 5]

$$PT100 = \frac{V3 - 2 \cdot V2 + V1}{V1 - V0} \times 100 \qquad (1)$$

As features of the circuit of FIG. 2, there are mentioned: (1) that the components other than the reference resistor 30 (Rref: 100Ω) are not affected by the temperature or the individual difference; (2) that, even if the measured voltages are changed in the voltage measurement of the divided voltages V0 to V3, the changes of the measured voltages do not affect the measurement of the resistance if the voltage ratio is correct; and (3) that the number of constituent elements (components) of the circuit is small.

Regarding the multiplexer-added A/D converter 33 for use in the voltage measurement of the divided voltages V0 to V3, here, the case is considered where characteristics thereof are changed as described below due to an influence from the ambient temperature and the like.

In the case where a change of a gain of the A/D converter 40 (see FIG. 1) is defined as α, and an offset thereof is defined as β in the following expression, the divided voltage V3 turns as: V3→αV3+β. Further, the divided voltage V2 turns as: V2→αV2+β. Further, the divided voltage V1 turns as: V1→αV1+β. Still further, the divided voltage V0 turns as: V0→αV0+β. Then, the above-mentioned expression (1) turns to an expression as described below.

[Expression 6]

$$PT100 = \frac{\alpha V3 + \beta - 2 \cdot (\alpha V2 + \beta) + \alpha V1 + \beta}{\alpha V1 + \beta - \alpha V0 - \beta} \times 100 \qquad (2)$$
$$= \frac{\alpha(V3 - 2 \cdot V2 + V1)}{\alpha(V1 - V0)} \times 100$$
$$= \frac{V3 - 2 \cdot V2 + V1}{V1 - V0} \times 100$$

As understood from the expression (2), even if the characteristics of the A/D converter 40 are changed, this change does not affect the measurement in terms of the expression. Note that the multiplexer-added A/D converter 33 is constructed by integrating the multiplexer 39 and the A/D converter 40 with each other in this embodiment, but the multiplexer-added A/D converter 33 is not limited to this configuration, and may be constructed by including the multiplexer 39 and the A/D converter 40, which are provided separately from each other.

Next, a description is made of the case where the number of resistor-type temperature sensors is two.

In FIG. 3, in the case where resistance values of the first resistor-type temperature sensor 22 (PT100) and the second resistor-type temperature sensor 23 (PT100) are defined as X1 and X2, respectively, the temperatures thereof can be represented from the following expressions (3) and (4) (the resistance values are arithmetically converted, whereby the temperatures can be represented).

[Expression 7]

$$X1 + RC = \frac{(V3 - V2)}{(V1 - V0)} \times 100 \qquad (3)$$

[Expression 8]

$$X2 + RC = \frac{(V2 - V1)}{(V1 - V0)} \times 100 \qquad (4)$$

In the case where values of the line-to-line resistors 24 (RC: cable resistors) are extremely small, the respective resistance values X1 and X2 can be determined by the above-mentioned expressions (3) and (4). It is understood that, in comparison with the case where the number of resistor-type temperature sensors is one as illustrated in FIG. 2, the temperatures can be measured by changing only the calculation expressions without increasing the components in the case where the number of resistor-type temperature sensors is two. However, actually, such a configuration including the two resistor-type temperature sensors can be used only in the case where the resistance values of the line-to-line resistors 24 (RC) are approximately 0.1Ω or less. Accordingly, those two resistor-type temperature sensors can be used only under limited conditions. It is considered that such a problem described above can be solved by changing the circuit configuration to a four-wire system. However, when the circuit configuration is attempted to be changed to the four-wire system, an extremely large demerit occurs. Hence, in the present invention, a circuit as described below is adopted.

FIG. 4 illustrates a circuit that can be used even at the time when the values of the line-to-line resistors 24 (RC) are large, in which the switching device (here, the FET 32 as an example) is provided at a position indicated by an arrow in FIG. 4. When the FET 32 is switched off, the current does not flow through this portion, and accordingly, the circuit of FIG. 4 becomes the same as the circuit of FIG. 3. Hence, values of X1+RC and X2+RC can be determined by using the expressions (3) and (4). Meanwhile, when the FET 32 is switched on, the current flows through this portion as illustrated by arrows in FIG. 5.

In the case where divided voltages at the respective points when the FET 32 is switched on are defined as V0on to V3on, and it is further assumed that the current flowing through X2 is as small as ignorable in comparison with the current flowing through X1 (actually, is changed by the resistance values of RC and X2 and ON-resistance of the FET 32), each value of the line-to-line resistors 24 (RC) can be represented by the following expression (5).

[Expression 9]

$$RC = \frac{V3on - V2on}{V1on - V0on} \times 100 - \frac{V3 - V2}{V1 - V0} \times 100 \quad (5)$$

The value of the line-to-line resistor 24 (RC) can be determined by the expression (5), and accordingly, a compensated resistance value related to the temperature can be determined.

Note that, in the expression (5), the value of the line-to-line resistor 24 (RC) is determined by subtracting a resistance value determined as the product of the voltage ratio based on the divided voltages and the reference resistance in such a non-conductive state between the second electric wire 26 and the third electric wire 27 from a resistance value determined as the product of the voltage ratio based on the divided voltages and the reference resistance in such a conductive state therebetween.

A description is made below of an example for realizing more highly accurate temperature measurement.

Here, by manufacturing the circuit, it is actually measured to which extent the current flowing through X2 in the above-mentioned assumption actually causes a measurement error. Results of the measurement are illustrated in Table 1.

With regard to measurement conditions at the time when the platinum temperature measuring resistor 100 Ω is used as X2, the ON-resistance of the FET 32 is fixed at 0.1Ω or less, and the line-to-line resistor 24 (RC) is fixed at 3.2Ω as a reference resistance value. Then, input values to X2 are input by a dial resistor, the circuit is constructed as illustrated in FIG. 4, and RC is indirectly determined from the expression (5). Then, the results as illustrated in Table 1 are determined.

TABLE 1

| Input Temperature | Input resistance value | | Measured value | |
|---|---|---|---|---|
| | X2 | Rc | X2 | Rc |
| −200 | 18.52 | 3.2 | 21.92 | 2.85 |
| −180 | 27.10 | 3.2 | 30.51 | 2.98 |
| −160 | 35.54 | 3.2 | 38.94 | 3.05 |
| −140 | 43.88 | 3.2 | 47.27 | 3.09 |
| −120 | 52.11 | 3.2 | 55.49 | 3.11 |
| −100 | 60.26 | 3.2 | 63.65 | 3.11 |
| −80 | 68.33 | 3.2 | 71.72 | 3.12 |
| −60 | 76.33 | 3.2 | 79.69 | 3.15 |
| −40 | 84.27 | 3.2 | 87.63 | 3.19 |
| −20 | 92.16 | 3.2 | 95.52 | 3.18 |
| 0 | 100.00 | 3.2 | 103.35 | 3.18 |
| 20 | 107.79 | 3.2 | 111.15 | 3.18 |
| 40 | 115.54 | 3.2 | 118.92 | 3.19 |
| 60 | 123.24 | 3.2 | 126.62 | 3.21 |
| 80 | 130.90 | 3.2 | 134.26 | 3.21 |
| 100 | 138.51 | 3.2 | 141.87 | 3.21 |
| 120 | 146.07 | 3.2 | 149.41 | 3.22 |
| 140 | 153.58 | 3.2 | 156.91 | 3.23 |
| 160 | 161.05 | 3.2 | 164.39 | 3.25 |
| 180 | 168.48 | 3.2 | 171.81 | 3.25 |
| 200 | 175.86 | 3.2 | 179.19 | 3.25 |

The measurement error of RC is approximately 0.4Ω at the maximum at the time of −200° C., and this is an error of approximately 1° C. in terms of temperature. The measurement error becomes the maximum, for example, at the time when a cable length (electric wire length) is set at 300 m (3.2Ω), in other words, at the time when the resistance of X2 is 18.52Ω and the temperature is −200° C. under a condition that the current flowing through X2 becomes the maximum. If this measurement error is regarded as large, the measurement error should be corrected. A description is made below of such correction.

In FIG. 5, at the time when the FET 32 is switched on, RC and X2 are connected in parallel to each other, and accordingly, the current flowing through X2 (IX2) can be represented by the next expression (6).

[Expression 10]

$$I \times 2\infty \frac{RC}{K \cdot X_2} \quad (6)$$

Hence, a correction expression of RC becomes a hyperbola (inverse proportion) of X2 because an amount of the correction is increased as the current flowing through X2 becomes larger. From this relationship therebetween, a coefficient K capable of approximating to Table 1 can be further determined, and the measurement error to be approximated can be corrected by a hyperbolic approximation (expression (7)) of X2 so as to become within 0.5° C. in terms of temperature and within 0.2Ω as a line-to-line resistance value. When RC after the correction is defined as RCX, the expression (7) is represented.

[Expression 11]

$$RCX = RC + \frac{RC}{0.3 \times X2} \quad (7)$$

The following Table 2 illustrates values of RCX, which are determined in the actual circuit configuration (temperature measuring circuit 21 of the present invention) by also using the expression (7). The values of RCX become within ±0.1Ω and ±0.25° C. in terms of temperature.

TABLE 2

| Input Temperature | Input resistance value | | Measured value | | |
|---|---|---|---|---|---|
| | X2 | Rc | X2 | Rc | Rcx |
| −200 | 18.52 | 3.2 | 21.92 | 2.85 | 3.283394161 |
| −180 | 27.10 | 3.2 | 30.51 | 2.98 | 3.305576314 |
| −160 | 35.54 | 3.2 | 38.94 | 3.05 | 3.311085431 |
| −140 | 43.88 | 3.2 | 47.27 | 3.09 | 3.307897186 |
| −120 | 52.11 | 3.2 | 55.49 | 3.11 | 3.296820448 |
| −100 | 60.26 | 3.2 | 63.65 | 3.11 | 3.272869861 |
| −80 | 68.33 | 3.2 | 71.72 | 3.12 | 3.265008366 |
| −60 | 76.33 | 3.2 | 79.69 | 3.15 | 3.281760572 |
| −40 | 84.27 | 3.2 | 87.63 | 3.19 | 3.311343528 |
| −20 | 92.16 | 3.2 | 95.52 | 3.18 | 3.290971524 |
| 0 | 100.00 | 3.2 | 103.35 | 3.18 | 3.282564103 |
| 20 | 107.79 | 3.2 | 111.15 | 3.18 | 3.275366622 |
| 40 | 115.54 | 3.2 | 118.92 | 3.19 | 3.279415854 |
| 60 | 123.24 | 3.2 | 126.62 | 3.21 | 3.294504818 |
| 80 | 130.90 | 3.2 | 134.26 | 3.21 | 3.289696112 |
| 100 | 138.51 | 3.2 | 141.87 | 3.21 | 3.28542116 |
| 120 | 146.07 | 3.2 | 149.41 | 3.22 | 3.291838119 |
| 140 | 153.58 | 3.2 | 156.91 | 3.23 | 3.298616829 |
| 160 | 161.05 | 3.2 | 164.39 | 3.25 | 3.315900197 |
| 180 | 168.48 | 3.2 | 171.81 | 3.25 | 3.313054149 |
| 200 | 175.86 | 3.2 | 179.19 | 3.25 | 3.310457243 |

As understood from Table 2, in a range from −200° C. to +200° C., the measurement error of 0.2Ω or less is able to be realized. Hence, the two resistor-type temperature sensors are constructed, whereby the measurement error in such a wide measurement temperature range can be suppressed to be extremely low (0.5° C./span).

It is a matter of course that, for the present invention, it is possible to implement a variety of modifications within the scope where the gist of the present invention is not changed. Specifically, the approximate expression for use in the present invention is not limited to the above-mentioned approximate expression, and other correction expressions may be used.

The invention claimed is:

1. A temperature measuring circuit in a flowmeter, comprising:

first and second resistor-type temperature sensors which are provided at first and second measuring positions in the flowmeter and form a serial connection state when one ends of the sensors are connected to each other;

a first electric wire which includes a line-to-line resistor and is connected to another end of the first resistor-type temperature sensor;

a voltage reference connected to the first electric wire through a power supply resistor;

a second electric wire which includes a line-to-line resistor and is connected to the one ends of the first and second resistor-type temperature sensors;

a third electric wire which includes a line-to-line resistor and is connected to another end of the second resistor-type temperature sensor;

a reference resistor in which one end thereof is connected to the third electric wire and another end side thereof is grounded;

a switching device that is connected to both of the second electric wire and the third electric wire and turns those electric wires to a conductive state or a non-conductive state;

a multiplexer that selects any one of the first electric wire, the second electric wire, the third electric wire, and the grounded side of the reference resistor;

an A/D converter that performs A/D conversion on divided voltages selected by the multiplexer; and an arithmetic operation/control device that controls the switching device and receives a signal from the A/D converter, wherein the arithmetic operation/control device determines a value of the line-to-line resistor by subtracting a resistance value determined as a product of a voltage ratio based on the divided voltages and a value of the reference resistor in the non-conductive state between the second electric wire and the third electric wire from a resistance value determined as a product of a voltage ratio based on the divided voltages and a value of the reference resistor in the conductive state therebetween.

2. A temperature measuring circuit in a flowmeter according to claim 1, wherein the determined value of the line-to-line resistor is corrected by a hyperbolic approximate expression related to the second resistor-type temperature sensor, to determine a corrected value of the line-to-line resistor.

* * * * *